May 25, 1965     D. M. ROEDER     3,186,001
PAD FOR NOSE REST FOR EYEGLASSES
Filed Dec. 26, 1962
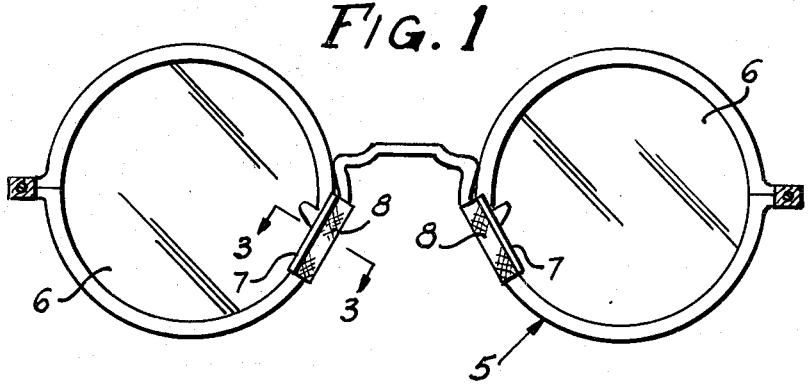
FIG. 1
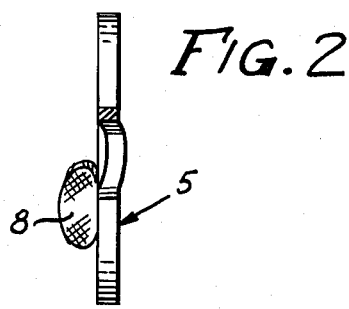
FIG. 2
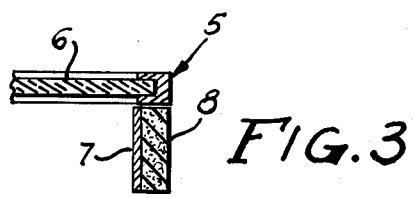
FIG. 3
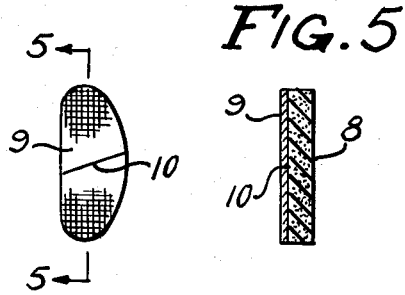
FIG. 5
FIG. 4
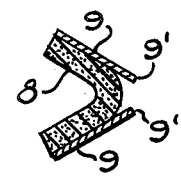
FIG. 6
INVENTOR.
D. M. ROEDER
BY
Kimmel & Crowell
ATTORNEYS.

United States Patent Office 3,186,001
Patented May 25, 1965

3,186,001
PAD FOR NOSE REST FOR EYEGLASSES
Delmar M. Roeder, 217 Reis Ave., Evansville, Ind.
Filed Dec. 26, 1962, Ser. No. 246,953
1 Claim. (Cl. 351—138)

This invention relates to nose pads for nose rests of eyeglasses, spectacles or the like, and is a continuation-in-part of my co-pending application, Serial No. 66,517, filed November 1, 1960, but now abandoned, entitled "Pad for Nose Rests of Eyeglasses."

By way of background, it is a well known fact that when the surface of the nose becomes moist by perspiration or skin oils, the nose rests of eyeglasses or spectacles tend to slip, allowing the lenses of the eyeglasses or spectacles to fall below the normal correct line of vision, causing an exceptionally inconvenient condition, particularly when the lenses of the eyeglasses or spectacles are of the bifocal type.

An important object of the invention is to provide a pad for the nose rests of eyeglasses or spectacles which will, in addition to providing a means for preventing accidental slippage of the eyeglasses or spectacles on the bridge of the nose of the wearer, form a pad which will also cushion the nose rests for the comfort of the wearer.

Still another object of the invention is the provision of a pad shaped to conform to the shape of the nose rests of eyeglasses, spectacles or the like, one surface of the nose pad being supplied with an adhesive material, such as a pressure sensitive adhesive, normally protected by a strip of scrim, which when removed exposes the adhesive material and which, when placed against the nose rests, firmly secures the pad on the nose rest against accidental displacement.

Another important object of the invention is to provide a pad of this character wherein the strip of scrim that normally protects the adhesive surface of the pad against deterioration, is provided with a scored indicating line on which the pad is folded upon itself, causing the ends of the strip of scrim to separate from the adhesive coated surface of the pad, providing loose ends to be pulled, effecting removal of the scrim, to expose the adhesive surface.

Other and further objects and advantages of this invention will be hereinafter described and the novel features thereof defined in the appended claim.

In the drawings:

FIGURE 1 is a rear elevational view of a pair of eyeglasses illustrating the pads forming the subject matter of the present invention as secured to the nose rests thereof.

FIGURE 2 is a sectional view through the bridge of the eyeglasses, illustrating a nose rest as equipped with a pad, the pad being shown in elevation.

FIGURE 3 is a sectional view taken on line 3—3 of FIGURE 1.

FIGURE 4 is a plan view of a nose rest pad constructed in accordance with the invention, illustrating the line on which the pad is folded for releasing the protecting scrim strip.

FIGURE 5 is a longitudinal sectional view taken on line 5—5 of FIGURE 4.

FIGURE 6 is an edge elevational view of the pad as bent along the indicating line to cause the strip of scrim material to separate from the pad for easy removal.

Referring to the drawing in detail, an eyeglass frame is indicated generally by the reference character 5 in which the lenses 6 are mounted in the conventional manner.

The reference characters 7—7 indicate the usual nose rests of the eyglass frame.

The pad forming the subject matter of the present invention is indicated generally by the reference character 8 and is constructed of foam rubber, foam plastic or the like, the shape of the pad being such as to conform to the general outline of the nose rests on which the pad is mounted. As shown in FIGURE 4, this shape is formed with a smooth perimeter by one straight side, opposite ends curved on an arc of a circle of short radius, and the other side being curved on an arc of a circle of longer radius.

The pad, which is of the desired thickness and of uniform physical characteristics throughout, is provided with adhesive material such as a pressure sensitive adhesive, covering one surface thereof, the adhesive material being protected normally by means of a strip of scrim material also shaped to conform to the general outline of the nose rest.

The scrim strip under normal conditions protects the adhesive surface so that when it is removed, the exposed adhesive surface may be pressed against the nose rest to which it is applied, causing the pad to securely fasten itself to the nose rest.

In order that the scrim may be readily and easily removed from the pad, a cut and indicating line of separation 10 is provided transversely through the scrim strip 9, at an acute angle with the straight side, the line being a distinctive color. In the embodiment shown, this indicating line 10 passes through the intersection of the axes of the pad, that is, through the intersection of the line through the centers of the curved ends and the line bisecting the arc forming the curved side, and is preferably inclined at an acute angle with reference to the latter line. The line 10 divides the scrim strip 9 into two separate similar portions and indicates the line of folding of the pad upon itself, as shown by FIGURE 6 of the drawing, and is either scored or cut through the scrim strip 9. The result is that upon bending the pad the free rather pointed ends 9' of the scrim strip 9 will separate from each other and from the inner surface of the pad 8, to permit the person using the pad to grip the extended rather pointed free ends 9' of the scrim strip 9 and, by exerting pulls thereon, remove the scrim strip 9 to expose the adhesive surface.

Thus it will be seen that due to this construction, the adhesive surface of the pad will be preserved and the pad may be readily fastened to the nose engaging surfaces of the nose rests of the eyeglasses.

Upon applying the pad to the nose rests of the eyeglasses, it is contemplated to wipe the outer surfaces of the nose rests free of moisture such as formed by perspiration or skin oils, so that the adhesive material, when exposed by removal of the scrim strip, will adhere to the nose rests in such a way as to eliminate any possibility of accidental displacement caused by removing and replacing the eyeglasses when equipped with the pads, forming the subject matter of the present invention.

In view of the foregoing detailed description and drawing, it is believed that the utility and method of using the pads will be obvious, and a further detailed disclosure of the invention is unnecessary.

I claim:

For use with an optometric mounting of the type having nose rests, an article comprising a cushion pad for said nose rests, siad pad being a uniformly thick body of foam rubber having a straight side, opposed ends curved on an arc of a circle, and a side curved on an arc of a circle of greater radius of curvature, a lever of adhesive substance on one face of the body, a covering strip of scrim material over the layer of adhesive substance, and a line of separation through the covering strip forming a fold line for the cushion pad and indicia along the line of separation to delineate the latter, said line of separation being positioned transversely of the cushion pad obliquely to said straight edge, and passing through the intersection of a construction line through the centers of the rounded ends of the cushion pad and an intersecting construction line bisecting the arc of the curved side, whereby, upon flexing of said cushion pad with the line of separation outwardly, the inner separated ends of said covering strip, each with an acute angle thereon, will be exposed for ready removal from the cushion pad.

References Cited by the Examiner

UNITED STATES PATENTS

| | | | |
|---|---|---|---|
| 1,473,151 | 11/23 | Kidwell | 88—48 |
| 1,960,137 | 5/34 | Brown. | |
| 2,147,802 | 2/39 | Scharfeld | 88—48 |
| 2,319,272 | 5/43 | Stan | 161—406 |
| 2,789,381 | 4/57 | Belgard | 88—53 |

JEWELL H. PEDERSEN, *Primary Examiner.*